INVENTORS
JAMES F. KING, JR. &
DONALD A. SLOAN
BY Mason, Fenwick & Lawrence
ATTORNEYS

United States Patent Office 3,321,896
Patented May 30, 1967

3,321,896
AUTOMATIC BOBBIN DONNING APPARATUS
James F. King, Jr., and Donald A. Sloan, Winston-Salem, N.C., assignors to The Bahnson Company, Winston-Salem, N.C., a corporation of North Carolina
Filed June 30, 1964, Ser. No. 379,079
23 Claims. (Cl. 57—53)

The present invention relates in general to apparatus for automatically donning bobbins onto spindles forming a line of spindles on textile processing machines and the like, and more particularly to apparatus adapted especially for use with automatic bobbin doffing devices to proceed automatically along a line of spindles of textile processing machines alongside and trailing the doffing device and don empty bobbins in succession on the vacated spindles from which full bobbins have been doffed.

Various mechanisms have been devised in an effort to achieve automatic doffing of full bobbins from a line of spindles on textile spinning machines and donning of empty bobbins on the vacated spindles. These have customarily taken the form of wheeled carriage mounted mechanisms, usually of considerable size and weight, designed to move alongside the line of spindles from one end of the spinning frame to the other, to rapidly and automatically effect doffing and donning operations and thereby reduce labor costs and machine shut-down time incident to the customary manual doffing and donning procedures. Difficult problems have been encountered in reducing the size and complexity of such equipment to a point where reliable operation can be achieved with apparatus which can be conveniently accommodated in the restricted aisle space between spinning frames and readily transported from one spinning frame to another in the spinning room. Because the downwardly opening central bores in the empty bobbins must be precisely oriented and aligned with the vacated spindles for proper and reliable donning, considerable problems of bobbin alignment and control and correlation of the same with spindle position are encountered. This is complicated by the fact that the bobbins are of tapered tubular cylindrical configuration, which in the case of fill bobbins include an enlarged butt at the lower end thereof, making it difficult to handle and insure proper control of such bobbins in automatic machinery involving conveyance and transfer of the bobbins. The tapered shape of the spindles is a particularly troublesome factor where the bobbins must be transferred from one conveying component to another in the donner, as jambs and ultimate lock-up of the mechanism are most difficult to avoid.

Since it is desired that the donning apparatus move along with and keep in step with the doffing instrumentalities, the donning apparatus should also install the empty bobbins on the spindles with sufficient speed and accuracy to keep up with the doffer without limiting the speed of operation of the doffer. Timing of the donner operating cycle with spindle location has frequently relied upon follower gears or wheels coacting with rack teeth or trip pins on the side of the spinning frame, but such timing expedients require customized mechanisms for different spinning frames due to variations in spindle spacing and components which must be manufactured with great precision. The donning apparatus should also have provision for conveniently changeable bobbin storage means whereby a supply of empty bobbins adequate for one or two whole lines of spindles on a spinning frame can be rapidly assembled on the donning apparatus.

An object of the present invention, therefore, is the provision of novel automatic bobbin donning apparatus for reliably and rapidly donning empty bobbins onto spindles in a line of spindles on textile processing machines and the like.

Another object of the present invention is the provision of automatic bobbin donning apparatus of compact size and rapid operation capable of being located on a carriage alongside an automatic bobbin doffing device to proceed along a line of spindles and successively don empty bobbins on the spindles from which full bobbins are doffed by the doffer.

Another object of the present invention is the provision of novel automatic bobbin donning apparatus having improved control of empty bobbin position and orientation to minimize mechanism lock-up raising from movement of the bobbins.

Another object of the present invention is the provision of novel automatic bobbin donning apparatus having convenient and improved means for loading a supply of bobbins into the apparatus adequate to serve at least a full line of spindles on a side of a textile spinning machine.

Another object of the present invention is the provision of novel automatic bobbin donning apparatus in which various operating components thereof can be readily shifted between an operative position relative to a spindle line and a retracted position to protect the components against possible damage.

Other objects, advantages and capabilities of the present invention will become apparent from the following detail description, taken in conjunction with the accompanying drawings illustrating a preferred embodiment of the invention.

The present invention, in general, overcomes the problems of high speed accurate advancement, alignment and transfer of the tapered cylindrical bobbins having enlarged bobbin butts, incident to reliable donning of empty bobbins onto a line of spindles, by storing the bobbins in upright position and feeding them to a discharge station in a linked flexible conveyor belt having upright tubular members connected together in spaced relation, which loosely house the bobbins and maintain them in proper vertical orientation. The conveyor belt, with the bobbins contained therein, is coiled upon itself in an upper can section of a storage canister unit, and progresses one tube at a time through a bobbin discharge station where the bobbins are vertically aligned for a time over the spindles on which they are to be deposited and gravitationally dropped onto the spindles, the belt then proceeding down a transition chute or ramp to a lower can station to again coil upon itself. The belt provides a convenient device for loading an adequate supply of empty bobbins to serve at least one full line of spindles on a side of a conventional spinning frame and to facilitate replenishment of the supply simply by substituting another loaded belt and associated upper can section on the donner apparatus to serve a subsequent line of spindles. The belt serves to maintain the bobbins in similar vertically oriented positions and feed them in a continuous flexible channel to the discharge station in a trouble-free manner avoiding the jambs or lock-ups that frequently occur when the bobbins are stored in a group of identical but separate channels from which they must be transferred to a comomn feed path for transfer to the discharge station. Further, the belt is moved in timed relation to the speed of travel of the donning apparatus along the spinning frame, whereby each bobbin is held directly over its associated spindle for an appreciable length of time to give the bobbin an exactly aligned discharge path from the donning apparatus to the spindle. This permits the attainment of the requisite reliability of operation with a unit of such compactness that it can be mounted beside a doffing unit on a single carriage which can be conveniently accommodate in the aisles between spinning frames in a spinning room.

Figure 1:
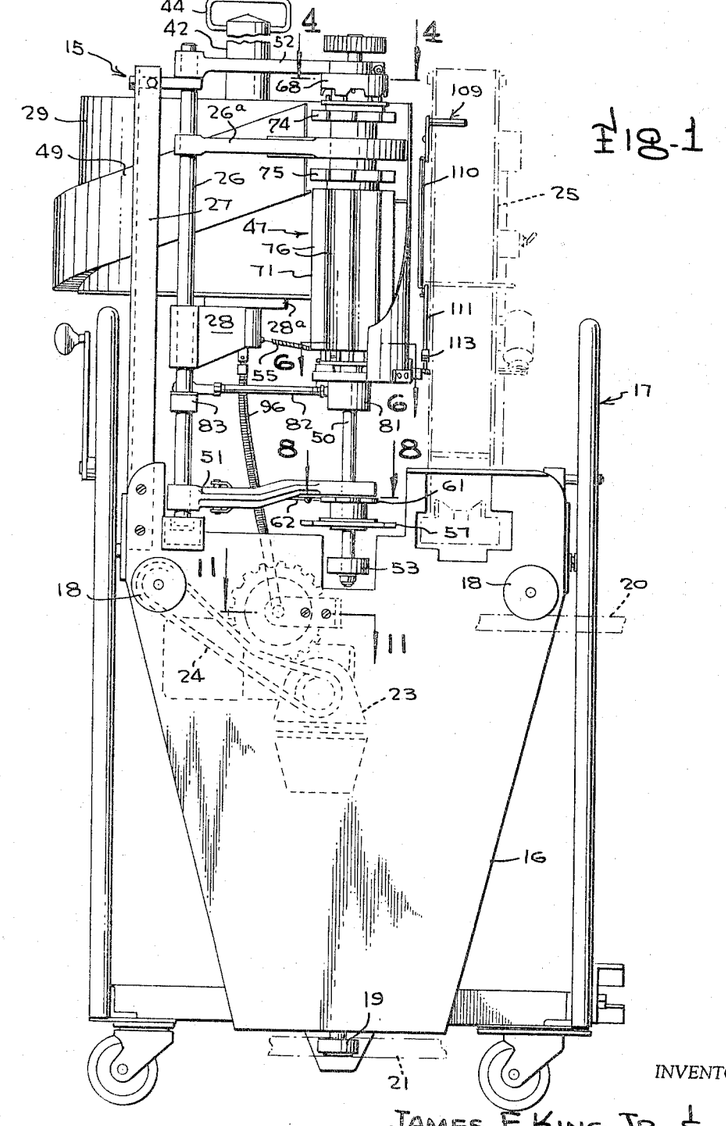
FIGURE 1 is a front elevation view of automatic bobbin donning apparatus embodying the present invention, illustrated on a wheeled carriage frame.

Referring to the drawings for a more complete understanding of the invention, like reference characters designating corresponding parts throughout the several figures, the automatic bobbin donning mechanism of the present invention is indicated generally by the reference character 15 and, as is illustrated in FIGURE 1, is designed to be mounted on the upper portion of a generally vertically extending mounting plate 16 preferably supported on a wheeled transport carriage 17 for convenient transportation between the spinning frames in a textile spinning room. The transport carriage 17 and mounting plate 16 are preferably of the construction disclosed more completely in our patent application Ser. No. 379,074 filed June 30, 1964, now U.S. Patent No. 3,286,857, entitled Transporting Carriage for Automatic Doffing Apparatus and the Like. In such a carriage construction, the mounting plate 16 has a pair of upper track wheels 18 and a single lower track wheel 19 projecting from the mounting plate 16 toward the spinning frame to fit on an upper track rail 20 and bear against a lower track rail 21 to support and maintain the mounting plate 16 in the desired vertical plane. The track rails 20, 21 would be fixed on the side of the spinning frame adjacent a line of spindles 22 thereon and arranged to properly orient the donner mechanism relative to the line of spindles. The donning mechanism and associated carriage are self-propelled along the length of the rails and line of spindles, for example, by an electric motor 23, and gear reduction unit, if desired, mounted on the rear side of the mounting plate 16, and coupled to at least one of the upper track wheels 18 by suitable means such as a drive chain or belt 24.

The donning mechanism 15 is preferably employed in side-by-side relation to an automatic doffing unit, indicated in broken lines in FIGURE 1 and designated by the reference character 25, both being mounted on the same carriage 17 with the donner in trailing relation to the doffer as the assembly moves along the line of spindles. A detailed disclosure of a suitable doffing unit is found in our patent application Ser. No. 379,170 entitled Automatic Bobbin Doffing Apparatus, filed June 30, 1964, now U.S. Patent No. 3,280,545.

The whole donning mechanism 15 is supported for swinging movement about a vertical axis on a vertical support rod 26 journaled on the mounting plate 16 and braced if desired on angle-iron post 27, to permit retraction of the donning mechanism from its normal operative position adjacent the line of spindles for a sufficient distance to clear the head and foot ends of the spinning frame as the device passes these regions. A supporting arm 28 rigidly mounted on this vertical support rod 26 at an intermediate location thereon extends in a direction away from the line of spindles 22 and terminates in an enlarged supporting platform 28a for the storage canister 29 in which the empty bobbins 30 are stored. An additional support arm 26a extending from rod 26 and welded to a side wall portion of the canister 29 stabilizes the canister. The canister 29 is designed to provide upper and lower wells or compartments 31, 32 for receiving the linked flexible conveyor belt 33 for the bobbins 30, the belt being formed of a large number of hollow tubular elements 34 to be maintained in upright position in the canister 29 and connected together by a nylon strap 35 coacting with flanges at each end of the tubes 34. The belt 33 is designed to contain one empty bobbin 30 to be donned onto the spinning frame in each tubular element 34 and to be coiled in spiral fashion in the upper compartment 31, from whence the belt is stepped past a belt feeding and bobbin discharge station in a selected path to the lower compartment 32.

Figure 10:
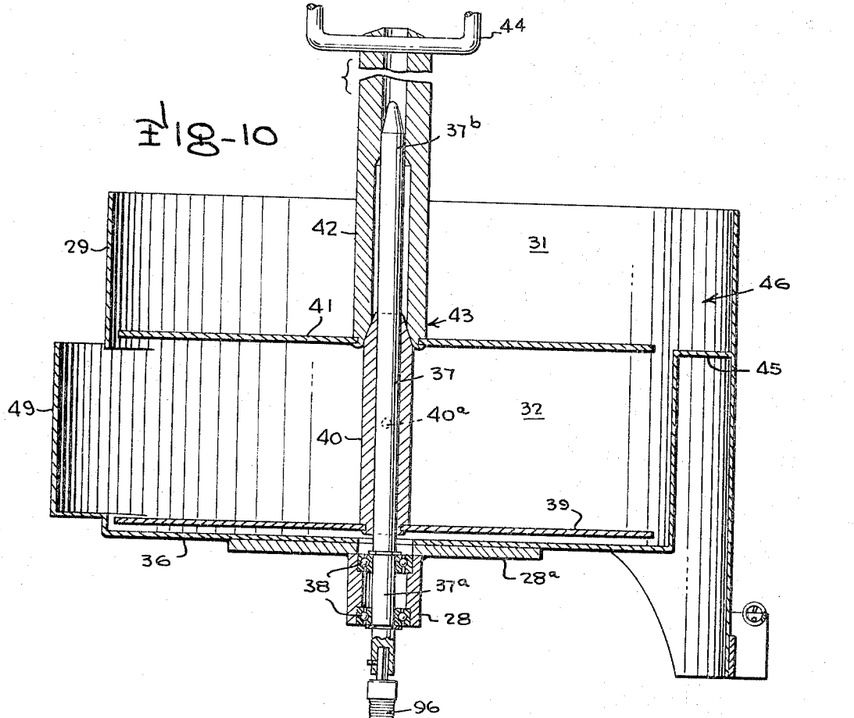
FIGURE 10 is a vertical section view of the storage canister means, taken along the line 10—10 of FIGURE 2.

The canister 29, as illustrated more clearly in FIGURE 10, has a stationary bottom wall 36 adapted to rest on the platform 28a through which a vertical center shaft 37 projects having a depending portion 37a extending through and journaled in a set of bearings 38 in the support arm 28 and an upwardly projecting portion 37b which in the illustrated embodiment extends above the top of the canister 29. Within the lower compartment 32 is a rotatable belt carrier formed by a circular plate 39 fixed to a collar 40 which is bored to receive the center shaft 37 and is secured thereto, as by set screw 40a, to rotate with the shaft 37. A rotatable belt carrier is provided in the upper compartment 31 by a circular bottom plate 41 and a collar 42 fixedly associated therewith, the upper collar 42 being bored to loosely receive and be positioned by the portions of shaft 37 extending above lower collar 40. The upper end of collar 40 is tapered as shown and the lower end of the bore in collar 42 is suitably shaped to butt against the tapered portion of collar 40 and form a friction base drive therewith, indicated at 43 in FIGURE 10. The side walls of the canister 29 form substantially circular surrounds about the upper and lower compartments 31, 32. The top end of the collar 42 is provided with a handle 44 which is always exposed above the canister 29 by which the upper compartment bottom plate 41 and collar 42 can be readily lifted out of the canister 29 or inserted therein and transported to or from some other location.

Figure 2:
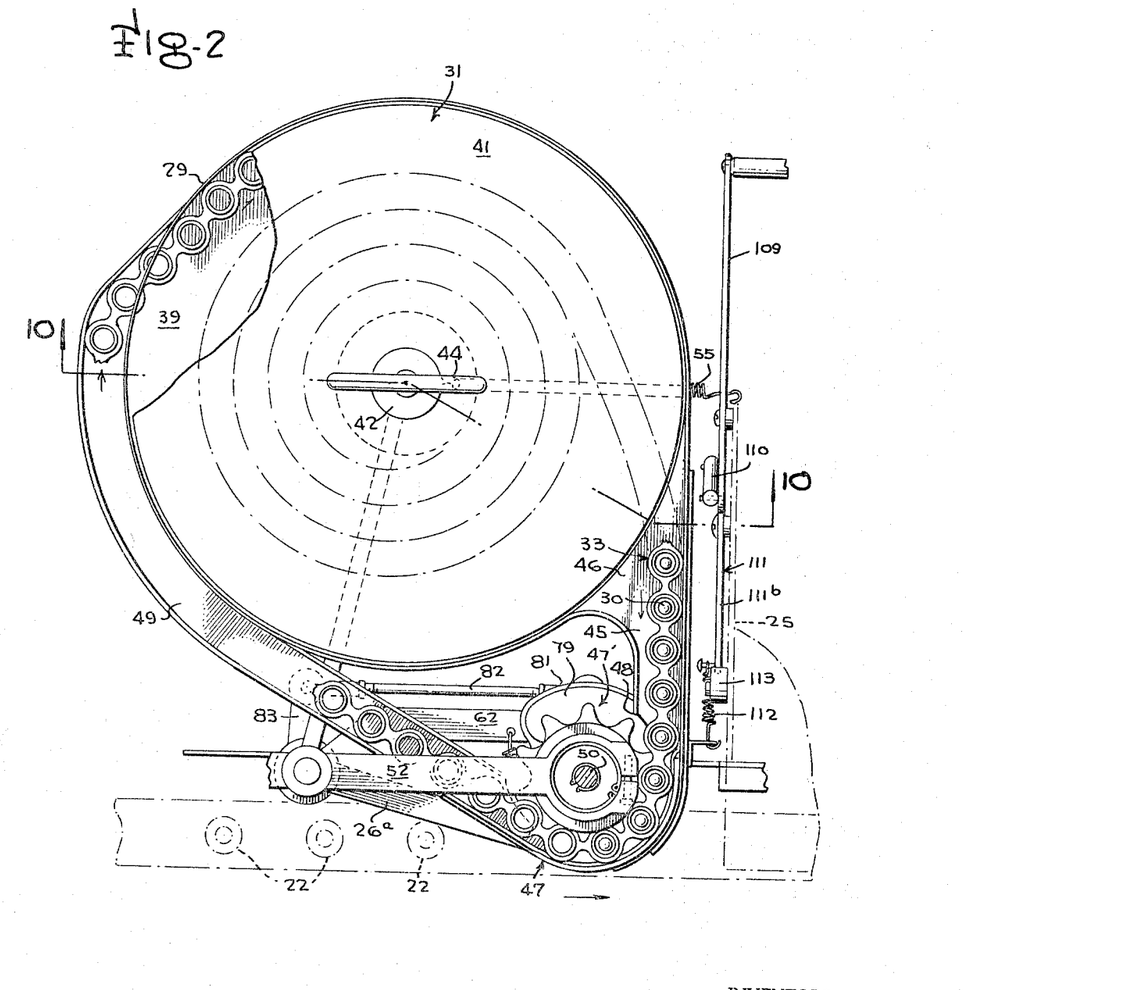
FIGURE 2 is an enlarged top plan view of the donner mechanism.

The upper compartment 31 opens upwardly to accommodate the bobbins 30 loaded in the belt 33 when the belt is coiled on the circular bottom plate 41 of the upper compartment in the manner indicated in broken lines in FIGURE 2, the height of the upper and lower compartments being each comparable to the height of the belt tubular elements 34. When so coiled in the upper compartment, the loaded belt 33 is lead outwardly from the periphery of the bottom plate 41 onto the bottom platform 45 of a tangential feed chute 46 which guides the belt to and around a turret mechanism and associated components forming a donning head 47 at the bobbin discharge station of the donning mechanism. The platform 45 of the feed chute 46 terminates in a lip 48, permitting free fall of the bobbins 30 until only their upper ends lie in the belt tubular elements and then gravitational discharge of the bobbins onto the spindles 22, in a manner hereinafter described. The now unloaded portions of the belt 33 then progress down an inclined transition chute 49, which may be either open topped as illustrated or have a closed top, to the periphery of the lower compartment 32 to enter a suitable opening in the side wall of the canister and spiral on the lower bottom plate 39 about the lower collar 40. Since the effective diameter of the belt coil in upper compartment 31 is progressively decreasing, while it is progressively increasing in the lower compartment 32, there will usually be a speed difference between the rotation of the two plates 39 and 41, and the slip clutch 43 between the upper and lower collars 40, 42 is provided to accomodate this relative movement.

Figure 3:
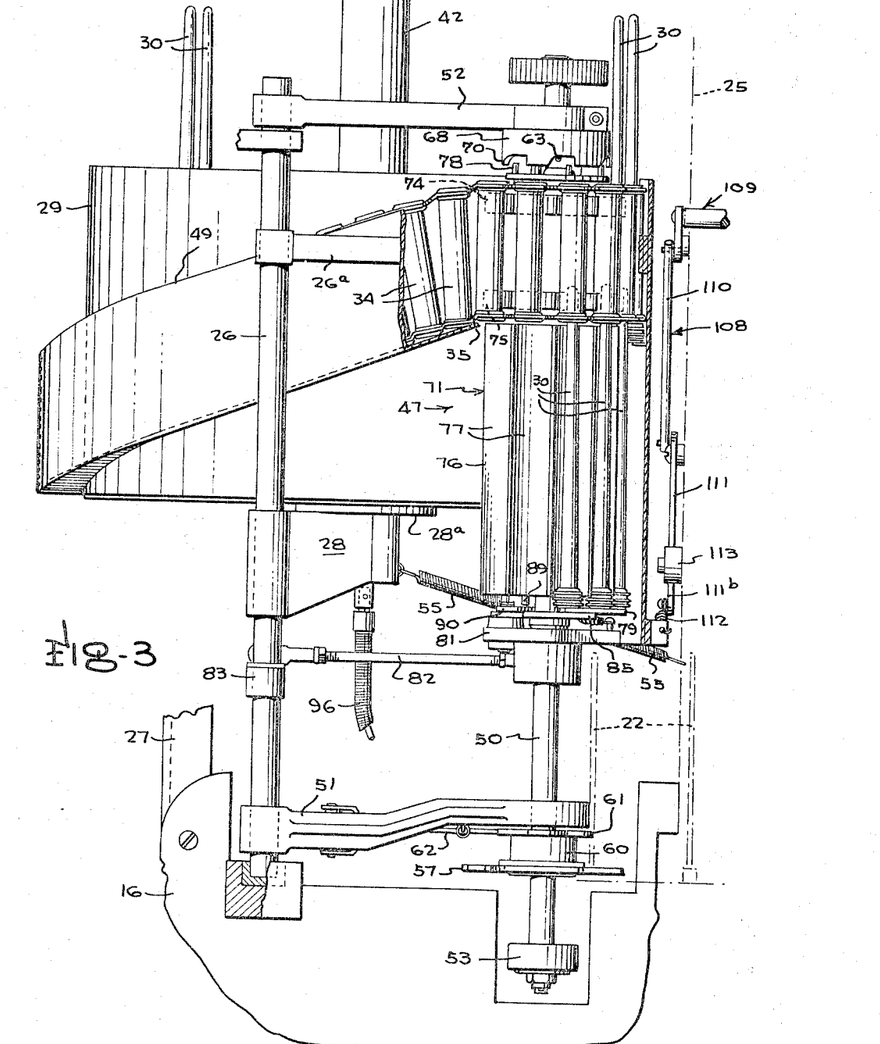
FIGURE 3 is an enlarged front elevation view of the donner mechanism, with parts of the belt and spindle storage canister means broken away.
Figure 8:
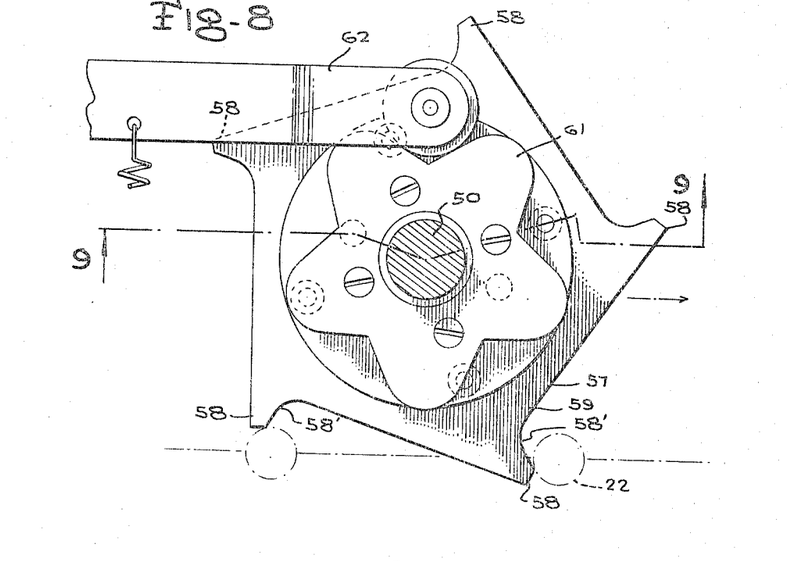
FIGURE 8 is a horizontal section view of the spindle following and turret detenting mechanism, taken along the line 8—8 of FIGURE 1.
Figure 9:
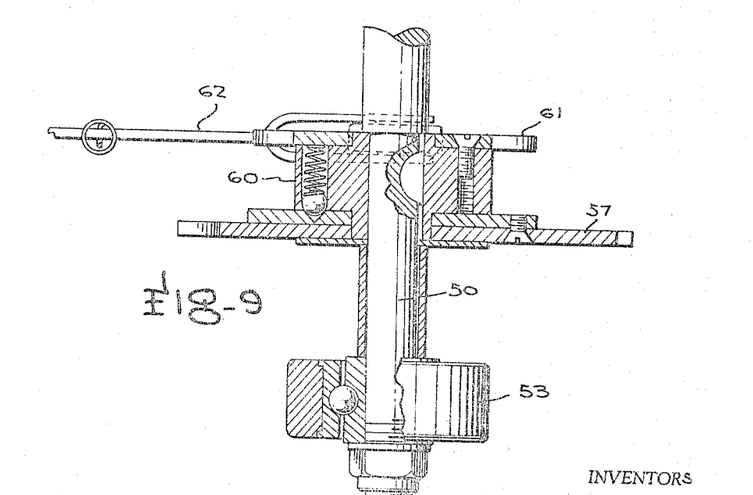
FIGURE 9 is a vertical section view taken along the line 9—9 of FIGURE 8.

The drive for the turret mechanism 47, which advances the conveyor belt 33 through the feed chute 46 and into the transition chute 49, is derived from the spindles 22 as the donning mechanism tracks on the spinning frame rails alongside the spindles. The turret mechanism 47 includes a vertical shaft 50 journaled in a pair of supporting arms 51, 52 projecting from the vertical support rod 26 and has a follower wheel or roller 53 at the lower end thereof adapted to bear against the spindle rail of the spinning frame, indicated at 54 in FIGURE 12. The spindle rail 54 is the heavy machine member running from end to end of the spinning frame into which the individual spindle bearings are attached. The whole donning mechanism 15 is biased toward the line of spindles to maintain the follower wheel 53 bearing against the spindle rail 54 by suitable means such as the spring 55, shown best in FIGURES 2 and 3, having its opposite ends respectively affixed to a portion of the donning mechanism such as the canister 29 and a stationary support such as a side of the doffer unit frame or an extension of the mounting plate 16. The shaft 50 is driven by the spindles by means of a five-lobe star wheel 57 shown in detail in FIGURES 8, 9, journaled on the shaft a short distance above the follower wheel 53 and in horizontal alignment with the bases of the spindles 22, the star wheel 57 having radially outwardly projecting lobes 58 adapted to be engaged by the successive spindles 22 as the donner mechanism travels along the line of spindles and a tangential flat surface portion 59 joined to the curved shoulder 58′ of one lobe and extending to the apex of the next lobe, whereby the curved shoulder 58′ engages one of the spindles 22 and is rotated 72° or one-fifth of a revolution after which the star wheel 57 loses contact with the relatively passing spindle. This arcuate motion imparted to the star wheel 57 is transmitted to the shaft 50 through a spring ball detent clutch 60, which is provided for overload protection, and a 72° detent cam 61 is affixed to the housing of the clutch assembly 60 and coacts with a spring loaded follower roller 62 riding the surface of the cam 61 to provide a positive 72° detent of the star wheel 57 and drive shaft 50.

Figure 4:
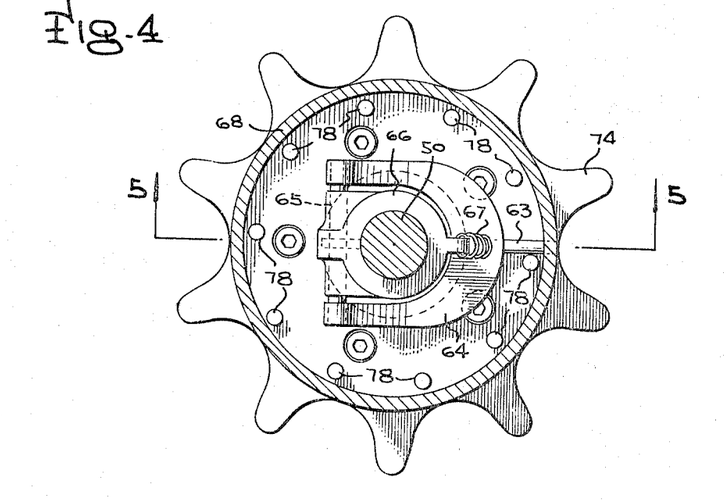
FIGURE 4 is a horizontal section view of the turret stepping mechanism rotated somewhat from the FIGURE 1 position, taken along the line 4—4 of FIGURE 1.
Figure 5:
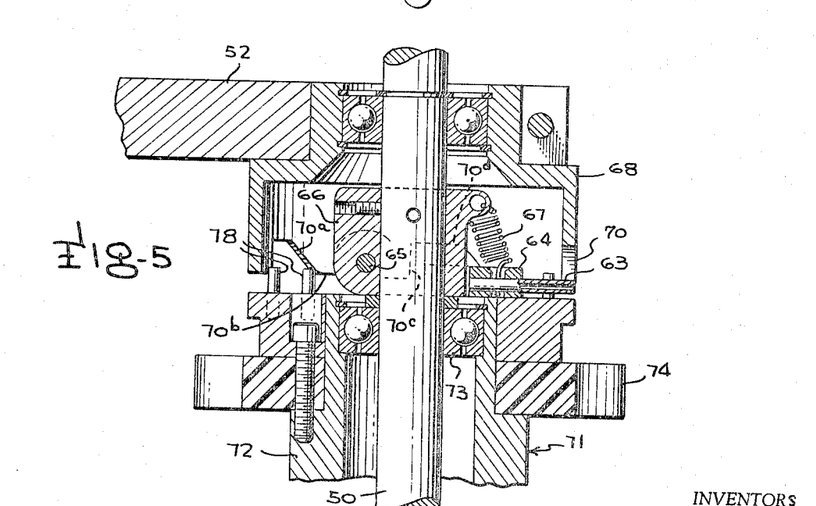
FIGURE 5 is a vertical section view taken along the line 5—5 of FIGURE 4.

While the star wheel 57 and drive shaft 50 are driven by the relatively passing spindles 22 through a 72° arc, only the 36° mid-stroke portion of this movement is employed to drive the belt feeding components of the turret mechanism 47, by the structure shown in detail in FIGURES 4 and 5. This 36° mid-stroke drive mechanism comprises a radially projecting drive pin 63 extending from a yoke 64 which is pivotally connected for movement about a horizontal pivot pin 65 to collar 66 keyed to the drive shaft 50 to rotate therewith. The yoke 64 and drive pin 63 can swing in a vertical plane and are spring loaded upwardly by a spring 67. The drive pin 63 is driven downwardly from its upwardly biased position by a stationary cylindrical cam 68 fixed to support arm 52 extending from vertical rod 26 and having five equally spaced lobes 70 to drive the drive pin 63 downwardly to the substantially horizontal position illustrated in FIGURE 5. Lying immediately below the drive pin 63 and stationary cylindrical cam 68 is the upper end of a donning turret 71 having a vertically elongated generally cylindrical body portion 72 journaled on the drive shaft 50 by roller bearings at its upper and lower end, one of which is indicated at 73 in FIGURE 5, and having in the preferred embodiment herein illustrated a pair of vertically spaced nylon drive sprockets 74, 75 and a fluted column 76, having concave flutes 77 on its outer periphery. Extending upwardly from the upper end of the turret body portion 72 and overlapping the lower edge of the cylindrical cam 68 are ten equally spaced upright pins 78. The function of the cylindrical cam 68 is to permit the drive pin 63 extending from the pivoted yoke 64 to be driven from its upwardly biased position to its downward horizontal position in 18° of rotation of the shaft 50, this being determined by the downwardly inclined ramp portion 70a of the cam lobe 70. This positions the drive pin 63 in a manner whereby interference between the vertical pins 78 and the drive pin 63 is achieved to cause rotation of the turret 71 as the drive shaft 50 is further rotated. When the turret 71 has been thus driven through a 36° arc, determined by the length of the lower horizontal lobe surface 70b, the drive pin 63 reaches the abrupt rise surface 70c of the cam lobe 70 and rises under the influence of its spring 67 out of interference relation with the vertical pins 78 terminating further driving movement of the turret 71. The shaft 50 continues to rotate responsive to the action of the spindle 22 on the star wheel 57 through a further 18° of rotation, determined by the upper horizontal lobe surface 70d, to the beginning of the next cam lobe surface, where the shaft 50 is detented by the spring loaded follower roller 62 and detent cam 61 to rest until another cycle is initiated.

The two drive sprockets 74, 75 forming part of the turret 71 are located at appropriate horizontal positions to engage the tubular elements 34 of the conveyor belt 33 immediately below and above the upper and lower straps 35 and advance the belt 33 in 36° increments during the mid-stroke portion of rotation of the drive shaft 50 from the lip 48 of the bottom platform 45 of feed chute 46 over the line of spindles 22, as illustrated in FIGURE 2, and into the transition chute 49. As each tubular element 34 passes beyond the lip 48 of the feed chute platform 46, the bobbin 30 therein loses its bottom support and drops axially downwardly into one of the concave flutes 77 of the fluted column 76 aligned with the bobbin. The fall of the bobbin 30 is temporarily arrested at the position illustrated in FIGURE 3 wherein the upper end portion, for example about one inch therof, of the bobbin 30 still lies within the tubular element 34 of the belt which it formerly occupied, by means of a pivoted platform 79 located immediately below the bottom of the fluted column portion 76 of the turret 71.

Figure 6:
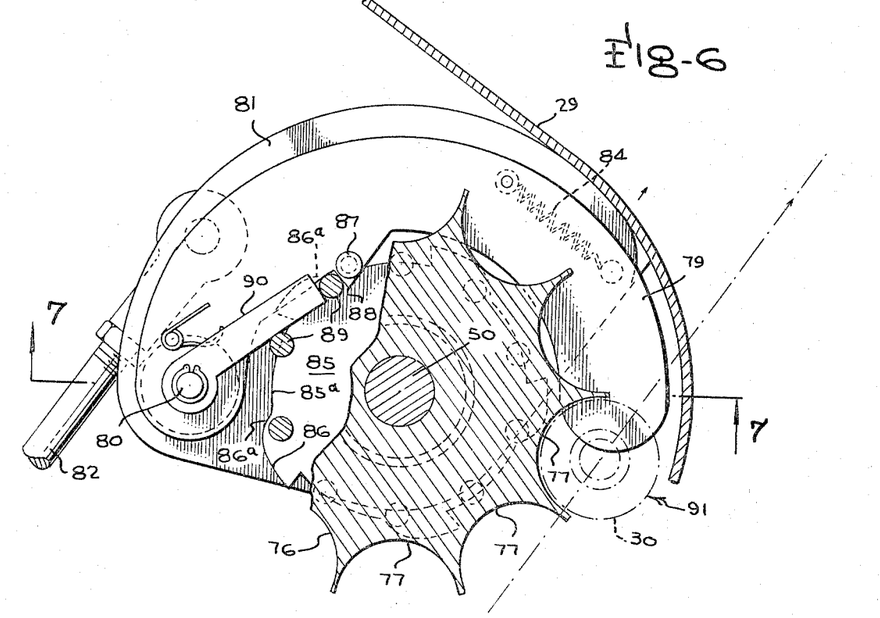
FIGURE 6 is a horizontal section view of the spindle releasing mechanism, taken along the line 6—6 of FIGURE 1.
Figure 7:
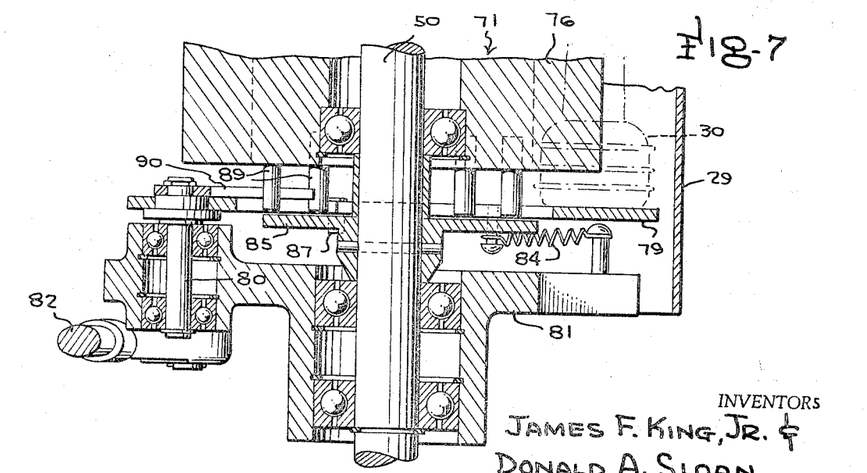
FIGURE 7 is a vertical section view, taken along the line 7—7 of FIGURE 6.

Referring to FIGURES 6 and 7 showing the details of this bobbin arresting mechanism, the curved platform 79 is supported on a vertical pivot shaft 80 extending from a carriage member 81 journaled on the drive shaft 50, to permit swinging movement of the platform 79 in a horizontal plane from a bobbin holding position shown in solid lines in FIGURE 6 to a release position wherein its free end portion substantially abuts the side of the canister 29. The carriage member 81 is held against rotation by torque arm 82 linked to a suitable anchoring collar 83 on support rod 26. The platform 79 is resiliently biased to the bobbin holding position wherein its free end underlies the bobbin 30 in the concave flute 77 at the bobbin discharge station by spring 84 connected between the platform 79 and carriage structure 81. A disk cam 85 having lobes 86 is keyed on drive shaft 50 and engages a depending pin 87 on the platform 79 disposed eccentrically of pivot shaft 80, the pin 87 normally lying in one of the troughs 85a of cam 85 to locate the platform 79 in the bobbin holding position. A shoulder 88 on the curved platform 79 also engages one of ten pins 89 depending from the lower end of turret 71 to detain the turret against rotation. A spring loaded pawl 90 also pivoted on shaft 80 engages the depending turret pins 89 to prevent rotation of the turret in a reverse direction.

Assuming the bobbin arresting mechanism to be in the condition illustrated in FIGURES 6 and 7, the bobbins drop onto the platform 79 as they are advanced beyond the lip 48 of feed chute platform 46, at about the second concave flute counting counterclockwise from the discharge station indicated at 91 in FIGURE 6, and advance in succession to the discharge station. Considering the operation of the turret mechanism to effect bobbin release at the discharge station 91, the rotation of the drive shaft 50, and consequently of the disk cam 85 through the first 18° of rotation from the detented position of shaft 50 and star wheel 57, causes the pin 87 to ride outwardly on the rise 86a of lobe 86 and accordingly swings the platform 79 counterclockwise about its pivot shaft 80 for a sufficient distance to wtihdraw the free end of the platform 79 from beneath the bobbin 30 in the concave turret flute 77 at the discharge station. This frees the bobbin to fall onto the spindle 22 aligned axially with the spindle because of the engagement of the spindle with the concave shoulder 58' of one of the star wheel lobes 58 and the interrelation of the turret mechanism components. Simultaneously, the shoulder 88 on the platform 79 is displaced outwardly to free the depending turret pin 87 engaged therewith. At this point, the drive pin 63 of the turret drive mechanism has just descended along the ramp 70a of cylindrical cam 68, so that the now released turret 71 is free to be driven through the 36° of arc during the mid-stroke portion of the movement of drive shaft 50. The platform 79 is retracted for only a small portion of this 36° rotation of the turret because the pin 87 is permitted to shift inwardly toward the axis of cam 85 as soon as the bobbin has been dropped, to place the free end portion of the platform 79 under the incoming bobbin being advanced to the discharge station 91 by the 36° rotation of the turret. It will be noted that the 36° rotation of the turret 71 by the interengagement of the spindle with the star wheel 57 keeps the concave flute 77 from which the bobbin exited onto the spindle aligned vertically with the spindle for the whole 36° of rotation, giving the bobbin an exactly aligned path onto the spindle. The return of the platform 79 to the bobbin holding position immediately after dropping of the bobbin at the discharge station 91 also returns the shoulder 88 to the stop position to engage the next approaching turret pin 89 and stop rotation of the turret at the 36° position, while the cam 85 and shaft 50 continue to rotate through the remaining 18° of rotation produced by the spindle engagement with the star wheel 57.

From the foregoing, it will be apparent that the donner mechanism 15, which pivots about the vertical support rod 26 and is urged toward the spindles by the spring 55, is normally located relative to the spindles by engagement of the follower wheel 53 with the spindle rail 54 when the star wheel 57 is free of engagement with the spindles. This preferably locates the bobbin discharge station 91 of the turret mechanism 47 about ⅛ inch too far in toward the spindles to accurately line up the bobbin in the turret flute 77 at the discharge station with the top of the spindle. The bobbin discharge station is then accurately lined up with the spindle onto which the bobbin is to be donned by the star wheel 57 which engages the spindle base in the curved lobe surface 58', as the shape of the star wheel is such as to cause the donner mechanism 15 to pivot outwardly about the support rod 26 as the donner reaches the bobbin discharge position so as to properly line up the bobbin to be discharged with the spindle. The action of the donner mechanism is then to oscillate slightly away from the spinning frame and then in toward the spinning frame as the star wheel 57 is rotated by the spindle being passed.

Figures 12, 13, 14:
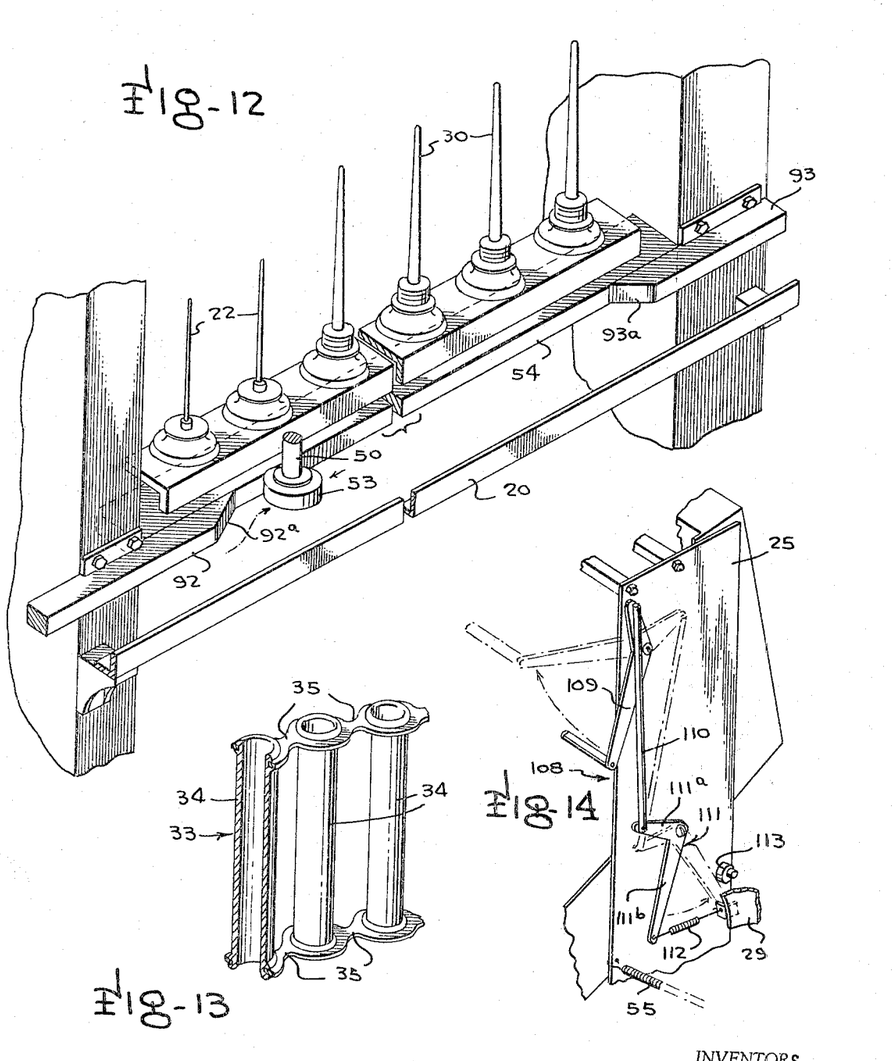
FIGURE 12 is a perspective view of a representative cam track, supporting track rails, and a line of spindles for a spinning frame designed to co-act with components of the donning mechanism.
FIGURE 13 is a perspective diagram of the bobbin feed belt illustrating details of the construction thereof.
FIGURE 14 is a perspective view of an exemplary mechanism for retracting the donner from its normal operative position.

As the turret position of the donner mechanism when adjacent the spindles projects vertically over the line of spindles, this portion would contact and be possibly injured by the ends of the spinning frame. This is prevented by providing protective cams 92, 93 at the ends of the spinning frame aligned with the spindle rail 54 and follower wheel 53, as shown in FIGURE 12. Cam 92, by forcing the follower wheel 53 outwardly away from the spinning rail holds the donner mechanism away from the frame end so that it does not contact the frame end as the donner carriage is pushed or driven along the track rails into position for operation on the first spindle in the line of spindles.

As the follower wheel 53 nears the end of the cam 92, it rides down the slope of the inclined surface 92a onto the spindle rail 54, allowing the donner mechanism 15 to swing inwardly about the vertical support rod 26 to the position over the line of spindles 22 as soon as the turret portion clears the frame end and before it reaches the first spindle. At the other end of the spinning frame, follower wheel 53 rides up the lead-in ramp 93a on cam 93 so as to retract the donner mechanism away from the spinning frame during its forward travel to allow the donner mechanism to clear the spinning frame on the leaving end.

When the donner mechanism 15 and its associated carriage 17 are removed from the track rails for transport between spinning frames, the follower wheel 53 becomes disengaged from either the cams 92, 93 or the spindle rail 54 and the donner mechanism 15 is resiliently biased by the spring 55 to a projected position beyond the normal position assumed.

The donner mechanism is preferably retractable from this projected position by a suitable manually operable mechanism, such as the overcenter lever and linkage mechanism 108 shown in FIGURES 1–3 and 14. This may comprise an upper manual lever 109 pivotally mounted on a suitable support, for example the adjacent side frame of the doffer 25, connected by link 110 to arm 111a of a bell-crank lever 111 on the same support. The other arm 111b of the lever 111 is coupled by a short spring 112 of stronger force than spring 55 to the canister 29. In the retracted position of this mechanism, shown in solid lines in FIGURE 14, the lever 109 occupies one overcenter position retracting the bell-crank arm 111b to a rearward position wherein the spring 112 overcomes the force of spring 55 and draws the donner rearwardly to an equilibrium position determined by the two springs. In the release position of this mechanism, shown in broken lines in FIGURE 14, the lever 111 is rotated counter clockwise until the arm 111b abuts adjustable eccentric stop 113 (for example on the differ side frame), positioning the spring 112 so that spring 55 can rotate the donner mechanism about rod 26 until follower wheel 53 engages cams 92, 93 or spindle rail 54.

To review the over-all operation of the donner mechanism hereinabove described, assuming the donner mechanism to be in its manually retracted position, the carriage 17 is wheeled to a position alongside the spinning frame at one end thereof and the mounting plate 16 is manipulated to fit the upper track wheels 18 onto the upper track rail 20 and to engage the lower track wheel 19 with the lower track rail 21. The donner mechanism is then manually released from its retracted condition to permit the spring 55 to swing the donner mechanism toward the spinning frame until the follower wheel 53 engages the cam 92. The carriage 17 is then advanced, either manually or automatically by its self-propelling drive mechanism, along the track rails 20, 21, permitting the follower wheel 53 to ride down the inclined surface 92a of cam 92 onto the spindle rail 54, thereby locating the drive shaft 50 and turret mechanism 47' relative to the line of spindles with the center of the bobbin discharge station 91 of the turret mechanism projecting about ⅛ inch toward the center of the spinning frame relative to the line of spindles. As the donning head 47 nears the first spindle, the star wheel 57 engages the base of the first spindle and is rotated in a clockwise direction as viewed in FIGURE 8 through a total arc of 72° as the donning head passes the first spindle.

The rotation of the star wheel 57 is transmitted through the clutch mechanism 60 to the drive shaft 50, and thence to the collar 66 and drive pin 63 above the turret 71. During the first 18° of rotation of the drive shaft 50, an inclined lobe surface 86a of the disc cam 85, also keyed to the drive shaft 50, forces the pin 87 on the curved pivoted platform 79 outwardly, swinging the platform 79 in a counterclockwise direction, as viewed in FIGURE 6, about its pivot shaft 80 and withdrawing its free end from beneath the bobbin 30 in the turret flute 77' at the bobbin discharge station 91 to allow the bobbin at the end of the initial 18° range of rotation to fall gravitationally onto the spindle now located therebeneath. When the drive shaft 50 completes its first 18° of rotation, the shoulder 88 on the pivoted platform 79 fully withdraws from its holding position with respect to the depending turret pin 89 previously held thereby, releasing the turret 71 for rotation, and simultaneously the inclined surface 70a of the stationary cam 68 has completed forcing of the drive pin 63 downwardly to its horizontal position achieving an interference condition with the upright turret pins 78. During the next 36° of rotation of the drive shaft 50, the drive pin 63 engaging one of the upright turret pins 78, drives the turret 71 through a corresponding arc. This effects rotation of the sprockets 74, 75 engaging the tubular elements 34 of the conveyor belt 33, and also the fluted column 76 of the turret 71, to advance the conveyor belt 33 and the fluted column in coordinated relation with the movement of the donner mechanism along the spindles. During this 36° of rotation, the flute 77' and the belt tubular element 34 from which the bobbin 30 is being discharged onto the spindle remains vertically aligned over the spindle to provide a precisely aligned discharge path for the bobbin, while another bobbin spaced three tubular elements back from the discharged bobbin passes over the lip 48 of the feed chute platform 46 and drops the aligned turret flute 77' to bottom on the platform 79. Concurrently, the bobbin resting on the platform 79 and occupying the turret flute next to the one from which the bobbin was just discharged is advanced to the discharge station 91, the platform 79 having returned promptly following discharge of the bobbin to the bobbin holding position to restrain the next bobbin against falling. At the conclusion of this 36° rotation, the drive pin 63 reaches the vertical shoulder 70c of the stationary cam 68, releasing the drive pin 63 and yoke 64 to pivot upwardly free of the upright pins 78 and thereby terminate driving of the turret 71, while another depending turret pin 89 reaches the shoulder 88 of the platform 79 to hold the turret against further rotation. The drive shaft 50 and star wheel 57, however, continue to rotate through a further 18° due to the relative movement of the spindle until the spindle leaves the star wheel and the detent follower 62 and detent 61 latch the star wheel and drive shaft. This process is repeated to successively discharge and advance bobbins as the donning mechanism passes each spindle until the follower wheel 53 rides up the ramp 93a of cam 93 to retract the donner mechanism sufficiently to clear the end of the spinning frame. The donner mechanism is then manually retracted for transport on the carriage to the next line of spindles to be doffed.

It is preferred that the linked conveyor belt 33 have enough tubular elements 34 to accommodate the number of empty bobbins required for a full line of spindles on a side of a spinning frame, usually 120–150 bobbins. A number of such belts can each be preloaded onto a corresponding number of removable upper canister insert units comprising the plate 41 and collar 42 to be substituted in the canister 29 after each line of spindles have been donned. It will be apparent that the coiled belt of bobbins on the upper plate 41 in the canister 29 will be advanced through the feed chute 46 and transition chute 49, and progressively coiled upon itself on the plate 39 in the lower canister compartment 32, as the star wheel 57 is rotated by the spindles 22, until the entire belt is emptied and lies in the lower compartment 32 and in the transition chute 49. The upper plate 41 can then be lifted off the center shaft 31 by the handle 44 and the empty belt group can be rotated slightly to draw the remainder of the empty belt from the chute 49, whereupon the operator can pick the belt off the bottom support plate 39 by hand and deposit it in some type of transportation cart for return to a loading station, and replace a loaded belt and upper plate unit in the canister to serve the next line of spindles.

Figure 11:
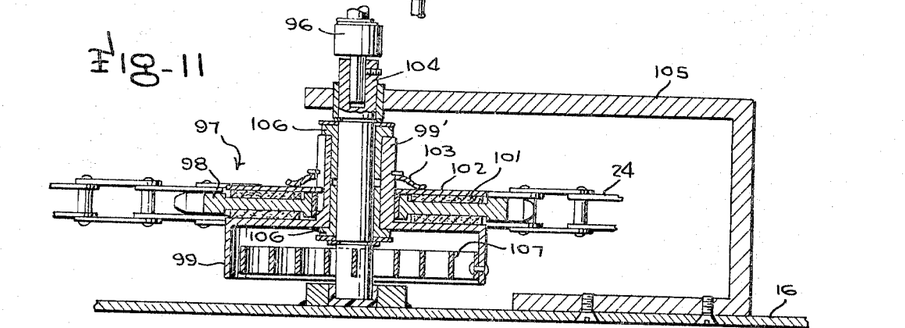
FIGURE 11 is a horizontal section view of the torque clutch for implementing drive of the feed belt, taken along the line 11—11 of FIGURE 1.

While the drive sprockets 74, 75 of the turret 71 rotated by engagement of the star wheel 57 with the spindles may be the sole driving force for unwinding the upper belt coil and winding the lower coil, some of this driving load may be relieved by also revolving the plates 39 and 41 in the canister 29. A suitable arrangement for rotating the plates 39, 41 may comprise a flexible shaft 96 coupled to the lower end of the center shaft 37 and driven by a torque clutch mechanism 97, shown in detail in FIGURE 11, from the motor driven drive chain 24. The torque clutch mechanism 97 includes a sprocket 98 meshed with the drive chain 24 and journaled on a constricted neck or boss 99' of a cylindrical spring housing drum 99, with friction disks 101 between the sprocket 98 and the adjacent wall of drum 99 and between the sprocket and a bearing disk 102 surrounding the constricted neck and urged toward the sprocket by spring washer 103. A central shaft 104, journaled at opposite ends in a bearing cup and in a mounting bracket 105 fixed to mounting plate 16, extends axially through the constricted neck 99' and supports the drum 99 by bearings 106. A torsion spring 107 within the enlarged portion of the drum 99 has one end fixed to the shaft 104 and its other end fixed to the peripheral flange of the drum 99. The exterior end of the shaft 104 is coupled to the flexible shaft 96, which transmits the driving torque to the center shaft 37 of the canister 29. By this arrangement, rotation of the sprocket 98 is transmitted to the drum 99 through the friction disks 101 to tension spring 107 until spring tension reaches a certain value, whereupon slippage occurs between the sprocket and drum until the spring torsion is reduced. The spring 107 in turn transmits torque to the shaft 104 and through the flexible shaft 96 to the center shaft 37 of the canister 29 to exert a rotary force on the canister plates 39 and 41 in the proper direction to continuously urge the loaded portions of the belt 33 into drive sprockets 74, 75 and continuously urge the unloaded belt portions away from the drive sprockets 74, 75 and down the transition chute 49 as soon as the belt 33 reaches the lower compartment plate 39.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for donning empty bobbins in succession onto a row of upright spindles on a textile processing machine comprising a donner unit adapted to move along a path parallel to the spindles having a bobbin discharge station to be positioned successively over the spindles, means for supplying empty bobbins in succession to said discharge station comprising an elongated flexible belt having a plurality of parallel open-bottomed bobbin storage tubes to be each loaded with a bobbin disposed in encircled coaxial relation therein, a storage station for storing the bobbin-loaded portions of said belt in a plural turn winding course about a selected axis, means for feeding said belt from said storage station through said discharge station to advance the bobbin-loaded tubes and their bobbins in upright, axially vertical positions into said discharge station, and means at said discharge station for donning said bobbins directly from encircled relation in at least a portion of their associated tubes onto the spindles.

2. Apparatus for donning empty bobbins in succession onto a row of upright spindles on a textile processing machine comprising a donner unit adapted to move along a path parallel to the spindles having a bobbin discharge station to be positioned successively over the spindles, means for supplying empty bobbins in succession to said discharge station comprising an elongated flexible belt having a plurality of parallel open-bottomed bobbin storage tubes to be each loaded with a bobbin disposed in encircled coaxial relation therein, a storage station for storing the bobbin-loaded portions of said belt in a plural turn spiral path about a selected axis, means for feeding said belt from said storage station through said discharge station to advance the bobbin-loaded tubes and their bobbins in upright, axially vertical positions into said discharge station, and means at said discharge station for locating said loaded tubes in succession in vertical axial alignment with the spindles to be donned and donning said bobbins directly from encircled relation in at least a portion of their associated tubes onto the spindles.

3. Apparatus for donning empty bobbins as defined in claim 2, including means spaced below said belt providing bottom support for said bobbins from said storage station to said discharge point.

4. Apparatus for donning empty bobbins in succession onto a row of upright spindles on a textile processing machine comprising a donner unit adapted to move along a path parallel to the spindles having a bobbin discharge station to be positioned successively over the spindles, means for supplying empty bobbins in succession to said discharge station comprising an elongated flexible belt having a plurality of parallel open-bottomed bobbin storage tubes to be each loaded with a bobbin disposed in encircled coaxial relation therein, storage means for said belt including a supply station for the bobbin-loaded portions of said belt and a receiving station for unloaded belt portions, said supply station and receiving station being located in vertically spaced relation aligned with a common vertical axis, means for feeding said belt from said supply station through said discharge station to said receiving station to advance the bobbin-loaded tubes and their bobbins in upright, axially vertical positions into said discharge station, and means at said discharge station for donning the bobbins delivered thereto onto the spindles.

5. In apparatus for donning empty bobbins as defined in claim 4, means for disposing said loaded and unloaded belt portions in coils about a common vertical axis through said supply and receiving stations, and a carrier plate forming a divider between said stations for supporting the belt portions at said supply station, said carrier plate being removable to afford access to the belt portions in said receiving station for removal thereof from the storage means and serving as a belt-support carrier for installing a coiled loaded belt thereon at the supply station.

6. Apparatus for donning empty bobbins in succession onto a row of upright spindles on a textile processing machine comprising a donner unit arranged to move along a path parallel to the spindles including a bobbin donning head to be positioned successively over the spindles for donning empty bobbins thereon, means for supplying empty bobbins in succession to said donning head comprising an elongated flexible belt having a plurality of parallel open-bottomed bobbin storage tubes to be each loaded with a bobbin disposed in encircled coaxial relation therein, storage means for supporting the bobbin-loaded portions of said belt in a coil about a vertical coil axis with the axes of the loaded belt tubes and their associated bobbins arranged in vertical postions paralleling said coil axis, means for feeding said belt along a feed path from said storage means through said donning head while maintaining said tubes and their associated bobbins continuously in axially vertical positions, and said donning head including means for advancing the loaded belt tubes successively into vertical axial alignment with said spindles and directly donning the bobbins from encircled relation in at least a portion of said belt tubes onto said spindles while maintaining said axial alignment.

7. Apparatus for donning empty bobbins in succession onto a row of upright spindles on a textile processing machine comprising a donner unit arranged to move along a path parallel to the spindles including a bobbin donning head to be positioned successively over the spindles for donning empty bobbins thereon, means for supplying empty bobbins in succession to said donning head comprising an elongated flexible belt having a plurality of parallel open-bottomed bobbin storage tubes to be each loaded with a bobbin disposed in encircled coaxial relation therein, supply storage means for supporting the bobbin-loaded portions of said belt in a coil about a vertical coil axis with the axes of the loaded belt tubes and their associated bobbins arranged in vertical positions paralleling said coil axis, take-up storage means for supporting unloaded portions of said belt in a coil about a vertical axis, means for feeding said belt along a feed path from said supply storage means through said donning head to said take-up storage means while maintaining the bobbin-loaded tubes continuously in axially vertical positions, and said donning head including means for advancing said belt tubes successively into vertical axial alignment with said spindles and directly donning the bobbins from encircled relation in at least a portion of said belt tubes onto said spindles while maintaining said axial alignment.

8. In apparatus for donning empty bobbins as defined in claim 7, said supply storage means and take-up storage means comprising an upwardly opening canister having a chamber of generally cylindrical configuration, a belt-supporting plate removably supported at a vertically intermediate position in said chamber defining upper and lower compartments for storage of loaded and unloaded portions of said belt respectively in coiled form about a vertical axis through said chamber, and chute means extending between said compartments and said donning head for guiding loaded belt tubes of said belt from said upper compartment to said donning head and unloaded belt tubes from said donning head to said lower compartment.

9. In apparatus for donning empty bobbins as defined in claim 7, means for maintaining said loaded tubes and their bobbins continuously in upright, axially vertical position at said supply and take-up storage means and during transit from said supply storage means to said donning head, and means spaced below said belt providing bottom support for the bobbins in the loaded tubes from said supply storage means to a selected discharge point in said donning head.

10. Apparatus for donning empty bobbins in succession onto a row of upright spindles on a textile processing machine comprising a donner unit arranged to move along a path parallel to the spindles including a donning head to be positioned successively over the spindles for donning empty bobbins thereon, means for supplying empty bobbins in succession to said donning head comprising an elongated flexible belt having a plurality of parallel open-bottomed bobbin storage tubes to loosely house a bobbin in encircled coaxial relation therein, storage means for storing the bobbin-housing portions of said belt in a plural turn coil, said donning head including a turret rotatable about a vertical axis having means for engaging the peripheries of said tubes and feeding said belt from said storage means through said donning head while maintaining said tubes and their associated bobbins continuously in upright axially vertical positions, including means for positioning said tubes successively in vertical axial alignment with said spindles, means for supporting the bobbins in said tubes during advancement to said turret until said tubes attain vertical alignment with the spindles, release means at said donning head for withdrawing support from said bobbins when vertically aligned with the spindles for gravitational discharge onto the spindles, and said turret means having vertically elongated, peripherally spaced channels below and aligned with the tubes to receive and guide bobbins released from said tubes in axially vertical positions along a release path onto the spindles.

11. Apparatus for donning empty bobbins in succession onto a row of upright spindles on a textile processing machine comprising a donner unit arranged to move along a path parallel to the spindles having a bobbin discharge station to be positioned successively over the spindles, means for supplying empty bobbins in succession to said discharge station comprising an elongated flexible belt having a plurality of parallel open-bottomed bobbin storage tubes to loosely house a bobbin in encircled coaxial relation therein, storage means for the bobbin-housing portions of said belt, a turrent mechanism at said discharge station rotatable about a vertical axis including a vertical shaft and a turret surrounding and driven from said shaft having sprocket members for engaging the peripheries of said tubes and feeding said belt from said storage means about a peripheral portion of said turret while maintaining said tubes and their associated bobbins continuously in upright axially vertical positions, and a fluted column portion below said sprocket members having vertically elongated cylindrically concave peripheral recesses axially aligned vertically with said tubes engaged by said sprocket members to be positioned successively in vertical axial alignment with said spindles, means for supporting the bobbins in a first supported condition fully inserted in said tubes during advancement to a position immediately adjacent said turrent and releasing the bobbins to a second supported condition in said column portion recesses and lying at least partially in said tubes until said tubes attain vertical alignment with the spindles, release means immediately below said column portion for supporting the bobbin in said second supported condition and withdrawing support therefrom when vertically aligned with the spindles for gravitational discharge of the bobbins onto the spindles, said column portion recesses below and aligned with the tubes receiving and guiding the bobbins released from said tubes in axially vertical positons along a release path onto the spindles.

12. In apparatus for donning empty bobbins as defined in claim 11, said means for supporting said bobbins in said first supported condition comprising a chute through which the bobbin-housing tubes are advanced from said storage means having a bottom wall providing bottom support for the bobbins in said tubes and terminating adjacent the turret to permit gravitational discharge of the lower portions of the bobbins into said column portion recesses, and said release means comprising a pivoted platform member supported for swinging movement about a vertical axis from a bobbin restraining position underlying a selected column portion recess vertically aligned with a spindle and intervening recesses between the same and said chute to a bobbin release position withdrawing bottom support from the bobbin in said selected recess.

13. In apparatus for donning empty bobbins as defined in claim 11, said means for supporting said bobbins in said first supported condition comprising a chute through which the bobbin-housing tubes are advanced from said storage means having a bottom wall providing bottom support for the bobbins in said tubes and terminating adjacent the turret to permit gravitational discharge of the lower portions of the bobbins into said column portion recesses, said release means comprising a pivoted platform member supported for swinging movement about a vertical axis from a bobbin restraining position underlying a selected column portion recess vertically aligned with a spindle and intervening recesses between the same and said chute to a bobbin release position withdrawing bottom support from the bobbin in said selected recess, means responsive to the positions of said spindles for rotating said shaft through a selected arc in pre-selected relation to movement of the donner unit alongside the spindle, and cam means on said shaft for actuating said platform member to said release position at a selected point during rotation of said shaft through said selected arc.

14. In apparatus for donning empty bobbins as defined in claim 11, said means for supporting said bobbins in said first supported condition comprising a chute through which the bobbin-housing tubes are advanced from said storage means having a bottom wall providing bottom support for the bobbins in said tubes and terminating adjacent the turret to permit gravitational discharge of the lower portions of the bobbins into said column portion recesses, said release means comprising a pivoted platform member supported for swinging movement about a vertical axis from a bobbin restraining position underlying a selected column portion recess vertically aligned with a spindle and intervening recesses between the same and said chute to a bobbin release position withdrawing bottom support from the bobbin in said selected recess, a star wheel member on said shaft having lobes for engaging base portions of said spindles to be driven thereby during movement of the donner unit alongside the spindles and rotate said shaft through a selected arc, and cam means on said shaft for actuating said platform member to said release position at a selected point during rotation of said shaft through said selected arc.

15. Apparatus for donning empty bobbins in succession onto a row of upright spindles on a textile processing machine comprising a donner unit arranged to move along a path parallel to the spindles having a bobbin discharge station to be positioned successively over the spindles, storage means for a plurality of empty bobbins, means for supplying empty bobbins from said storage means to said discharge station, a turrent mechanism at said discharge station rotatable about a vertical axis including a vertical shaft and a turret coupled in selectively driven relation thereto, said turret having feed members for feeding the bobbins through an arcuate path about portions of the turret while maintaining the bobbins continuously in upright axially vertical positions paralleling the shaft axis, and a fluted column below said feed member having vertically elongated, circumferentially spaced, cylindrical concave recesses axially aligned vertically with the bobbins in said arcuate path to be positioned successively in vertical axial alignment with said spindles, means for supporting the bobbins at an elevated position above said column during advancement to said turret until said tubes attain vertical alignment with said recesses and thereupon releasing the same to a lower position extending into said recesses, and release means immediately below said column for supporting the bobbin in said lower position through a range of movement in said arcuate path and withdrawing support from said bobbins when vertically aligned with the spindles for gravitational discharge onto the spindles, said column recesses aligned with the bobbins guiding the bobbins released therefrom in axially vertical positions along a release path onto the spindles.

16. In apparatus for donning empty bobbins as defined in claim 15, said release means comprising a pivoted platform member supported for swinging movement about a vertical pivot axis at a bobbin restraining position underlying a column recess vertically aligned with a spindle and intervening column recesses between the same and the point of bobbin release to said lower position and movable about its vertical pivot axis for withdrawing bottom support from the bobbin in said column recess vertically aligned with a spindle.

17. In apparatus for donning empty bobbins as defined in claim 15, said release means comprising a pivoted platform member supported for swinging movement about a vertical pivot axis at a bobbin restraining position underlying a selected column recess vertically aligned with a spindle and intervening column recesses between the same and the point of bobbin release to said lower position, said platform member being movable about its vertical pivot axis to a release position for withdrawing bottom support from the bobbin in said selected recess, means responsive to the positions of said spindles for rotating said shaft through a selected arc in preselected relation to movement of the donner unit alongside the spindle, and cam means on said shaft for actuating said platform member to said release position at a selected point during rotation of said shaft through said selected arc.

18. In apparatus for donning empty bobbins as defined in claim 15, said release means comprising a pivoted platform member supported for swinging movement about a vertical pivot axis at a bobbin restraining position underlying a selected column recess vertically aligned with a spindle and intervening column recesses between the same and the point of bobbin release to said lower position, said platform member being movable about its vertical pivot axis to a release position for withdrawing bottom support from the bobbin in said selected recess, a star wheel member on said shaft having lobes for engaging base portions of said spindles to be driven thereby during movement of the donner unit alongside the spindles and rotate said shaft through a selected arc, and cam means on said shaft for actuating said platform member to said release position at a selected point during rotation of said shaft through said selected arc.

19. In apparatus for donning empty bobbins onto a row of upright spindles on a textile processing machine having track rails alongside the row of spindles, the combination recited in claim 18, wherein a support structure is provided for supporting said donner unit having track wheels adapted to engage said rails and movably support the donner unit therefrom, said bobbin discharge station having a bobbin release point from which bobbins are released by said release means onto the spindles, means supporting said donner unit on said support structure for relative movement as a unit about a vertical pivot axis between a retracted position spacing said donned unit away from contact with any portion of the processing machine and an active position disposing the axes of bobbins at said bobbin release point slightly inwardly toward the center of the processing machine from a vertical plane through said row of spindles, and said star wheel being shaped to regulate spacing of said turret mechanism relative to the row of spindles by contact with the spindles to dispose the axis of a bobbin at said bobbin release point in precise vertical alignment with the axis of a spindle during operation of said release means to discharge a bobbin.

20. Apparatus for donning empty bobbins in succession onto a row of upright spindles on a textile processing machine, comprising a carriage adapted to move along a path adjacent and parallel to the row of spindles, and elongated vertical support member extending upwardly from said carriage, a donner unit having bobbin storage means and a bobbin donning head connected together for coordinate swinging movement in a horizontal direction about a vertical pivot axis through said support member, means pivotally supporting said donner unit from said support member for movement about said pivot axis, said donning head including a rotatable vertical shaft and a bobbin feed and discharge mechanism coupled to said shaft to be driven thereby for feeding bobbins from said storage means to said donning head and discharging the same from a selected discharge point in said donning head onto the spindles, resilient means for urging said donner unit about said pivot axis toward the row of spindles to a position disposing said discharge point of said donning head beyond a vertical plane through the row of spindles toward the center of the processing machine, and wheel means on said shaft for engaging the spindles shaped to dispose said donning unit against the action of said resilient means at a position vertically aligning said discharge point with a spindle.

21. Apparatus for donning empty bobbins in succession onto a row of upright spindles on a textile processing machine, comprising a carriage adapted to move along a path adjacent and parallel to the row of spindles, an elongated vertical support member extending upwardly from said carriage, a donner unit having bobbin storage means and a bobbin donning head connected together for coordinate swinging movement in a horizontal direction about a vertical pivot axis through said support member, means pivotally supporting said donner unit from said support member for movement about said pivot axis, said donning head including a rotatable vertical shaft and a bobbin feed and discharge mechanism coupled to said shaft to be driven thereby for feeding bobbins from said storage means to said donning head and discharging the same from a selected discharge point in said donning head onto the spindles, resilient means for urging said donner unit about said pivot axis toward the row of spindles to a position disposing said discharge point of said donning head beyond a vertical plane through a row of spindles toward the center of the processing machine, wheel means on said shaft for engaging the spindles shaped to dispose said donning unit against the action of said resilient means at a position vertically aligning said discharge point with a spindle, and manually operable means for retracting said donner unit about said pivot axis in a direction away from the row of spindles to a retracted position spacing all parts of the donner unit out of intercepting relation with the processing machine when said carriage moves along said path including means for releasably latching said manually operable means to hold said donning means in said retracted position.

22. Apparatus for donning empty bobbins in succession onto a row of upright spindles on a textile processing machine having opposite end portions and a spindle rail extending therebetween, comprising a carriage adapted to move along a path adjacent and parallel to the row of spindles, an elongated vertical support member extending upwardly from said carriage, a donner unit having bobbin storage means and a bobbin donning head connected together for coordinate swinging movement in a horizontal direction about a vertical pivot axis through said support member, means pivotally supporting said donner unit from said support member for movement about said pivot axis, said donning head including a rotatable vertical shaft and a bobbin feed and discharge mechanism coupled to said shaft to be driven thereby for feeding bobbins from said storage means to said donning head and discharging the same from a selected discharge point in said donning head onto the spindles, resilient means for urging said donner unit about said pivot axis toward the row of spindles, a follower roller on said shaft to be urged by said resilient means into rolling engagement with said spindle rail for locating said donning unit at a position disposing said discharge point of said donning head beyond a vertical plane through the row of spindles toward the center of the processing machine, and wheel means on said shaft for engaging the spindles shaped to dispose said donning unit against the action of said resilient means at a position vertically aligning said discharge point with a spindle.

23. Apparatus for donning empty bobbins in succession onto a row of upright spindles on a textile processing machine having opposite end portions, a spindle rail extending therebetween and end cam members horizontally aligned with and projecting outwardly from the surface of said spindle rail, comprising a carriage adapted to move along a path adjacent and parallel to the row of spindles, an elongated vertical support member extending upwardly from said carriage, a donner unit having bobbin storage means and a bobbin donning head connected together for coordinate swinging movement in a horizontal direction about a vertical pivot axis through said support member, means pivotally supporting said donner unit from said support member for movement about said pivot axis, said donning head including a rotatable vertical shaft and a bobbin feed and discharge mechanism coupled to said shaft to be driven thereby for feeding bobbins from said storage means to said donning head and discharging the same form a selected discharge point in said donning head onto the spindles, resilient means for urging said donner until about said pivot axis toward the row of spindles, a follower roller on said shaft to be urged by said resilient means into rolling engagement with said spindle rail for locating said donning unit at a position disposing said discharge point of said donning head beyond a vertical plane through the row of spindles toward the center of the processing machine, and wheel means on said shaft for engaging the spindles shaped to dispose said donning unit against the action of said resilient means at a position vertically aligning said discharge point with a spindle, said follower roller when tracking on said outwardly projecting end cam members forcing said donning head in a direction away from said processing machine to a position free of intercepting contact with the end portions of said processing machine.

References Cited

UNITED STATES PATENTS

| | | | |
|---|---|---|---|
| 1,142,010 | 6/1915 | Boozer et al. | 57—53 |
| 1,142,011 | 6/1915 | Boozer et al. | 57—53 |
| 3,077,725 | 2/1963 | Du Buis et al. | 57—53 |

FRANK J. COHEN, *Primary Examiner.*

STANLEY N. GILBREATH, *Examiner.*

J. PETRAKES, *Assistant Examiner.*